US012358026B2

(12) United States Patent
Falconer

(10) Patent No.: US 12,358,026 B2
(45) Date of Patent: Jul. 15, 2025

(54) BURR REMOVAL TOOL

(71) Applicant: Andre Falconer, Las Vegas, NV (US)

(72) Inventor: Andre Falconer, Las Vegas, NV (US)

( * ) Notice: Subject to any disclaimer, the term of this patent is extended or adjusted under 35 U.S.C. 154(b) by 451 days.

(21) Appl. No.: 17/982,093

(22) Filed: Nov. 7, 2022

(65) Prior Publication Data

US 2024/0149306 A1 May 9, 2024

(51) Int. Cl.

| | |
|---|---|
| ***B08B 1/12*** | (2024.01) |
| ***B08B 9/02*** | (2006.01) |
| ***B08B 9/027*** | (2006.01) |
| ***B24B 29/00*** | (2006.01) |
| ***B24B 29/08*** | (2006.01) |

(52) U.S. Cl.
CPC ................ *B08B 1/12* (2024.01); *B08B 9/021* (2013.01); *B08B 9/027* (2013.01); *B24B 29/005* (2013.01); *B24B 29/08* (2013.01)

(58) Field of Classification Search
CPC .. B08B 1/12; B08B 1/32; B08B 9/021; B08B 9/027; B08B 9/023; B24B 9/00; B24B 27/003; B24B 29/005; B24B 29/04; B24B 29/08; B24D 13/10; B23B 5/167
USPC ............................ 15/88, 4; 29/81.05; 451/51
See application file for complete search history.

(56) References Cited

U.S. PATENT DOCUMENTS

| | | | | |
|---|---|---|---|---|
| 4,038,715 A * | 8/1977 | Litt | B24D 15/00 15/104.03 |
| 4,862,549 A | 9/1989 | Criswell | |
| 5,056,265 A * | 10/1991 | Hurst | B24B 9/007 15/104.095 |
| 5,307,534 A | 5/1994 | Miller | |
| 5,791,005 A * | 8/1998 | Grabowski | B23K 20/24 15/104.04 |
| 6,745,425 B1 | 6/2004 | Tope | |
| 11,752,564 B1 * | 9/2023 | Sweigart | B25B 13/5016 470/209 |
| 2004/0158946 A1 * | 8/2004 | Monson | B08B 9/023 15/104.04 |
| 2010/0122423 A1 | 5/2010 | Lozar | |

* cited by examiner

*Primary Examiner* — Robert F Neibaur

(57) ABSTRACT

A burr removal tool for preparing a pipe for soldering includes a cylinder that has a pair of wells each recessed into opposing ends of the cylinder for insertably receiving an end of a pipe. The cylinder has a plurality of first bristles each disposed within a respective one of the wells. The plurality of first bristles in a respective one of the wells scrubs the pipe when the pipe is inserted into the respective well for abrading burrs from the pipe. A pair of brushes is each coupled to and extends away from the cylinder thereby facilitating a respective one of the brushes to be inserted into the pipe for scrubbing inside of the pipe. Additionally, each of the brushes is perpendicularly oriented with the pair of wells in the cylinder.

7 Claims, 5 Drawing Sheets

BURR REMOVAL TOOL

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to burr tools and more particularly pertains to a new burr tool for preparing a pipe for soldering. The tool includes a cylinder with a well in each end of the cylinder and first bristles disposed in each well for abrading a pipe that is inserted into a respective well. The tool includes a pair of brushes attached to the cylinder which can be inserted into the pipe for abrading an interior of the pipe. Each of the brushes is oriented perpendicular to the wells.

(2) Description of Related Art Including Information Disclosed Under 37 CFR 1.97 and 1.98

The prior art relates to burr tools including a pipe cleaning fitting that includes a cylinder with bristles disposed in the cylinder and a brush extending outwardly from the cylinder. The prior art discloses a rotary pipe tool that includes a male brush on a first end of the rotary pipe tool and a female brush on a second end of the rotary pipe tool. The prior art discloses a de-burring tool that includes a housing with a pair of apertures for insertably receiving a pipe and bristles disposed in the apertures for scrubbing the pipe and a pair of brushes each extending in opposite directions from the housing to scrub an interior of the pipe. The prior art discloses a pipe preparation tool that includes a cylinder with bristles disposed within the cylinder to scrubbing a pipe and cutting teeth integrated into the cylinder to de-burring an end of the pipe.

BRIEF SUMMARY OF THE INVENTION

An embodiment of the disclosure meets the needs presented above by generally comprising a cylinder that has a pair of wells each recessed into opposing ends of the cylinder for insertably receiving an end of a pipe. The cylinder has a plurality of first bristles each disposed within a respective one of the wells. The plurality of first bristles in a respective one of the wells scrubs the pipe when the pipe is inserted into the respective well for abrading burrs from the pipe. A pair of brushes is each coupled to and extends away from the cylinder thereby facilitating a respective one of the brushes to be inserted into the pipe for scrubbing inside of the pipe. Additionally, each of the brushes is perpendicularly oriented with the pair of wells in the cylinder.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
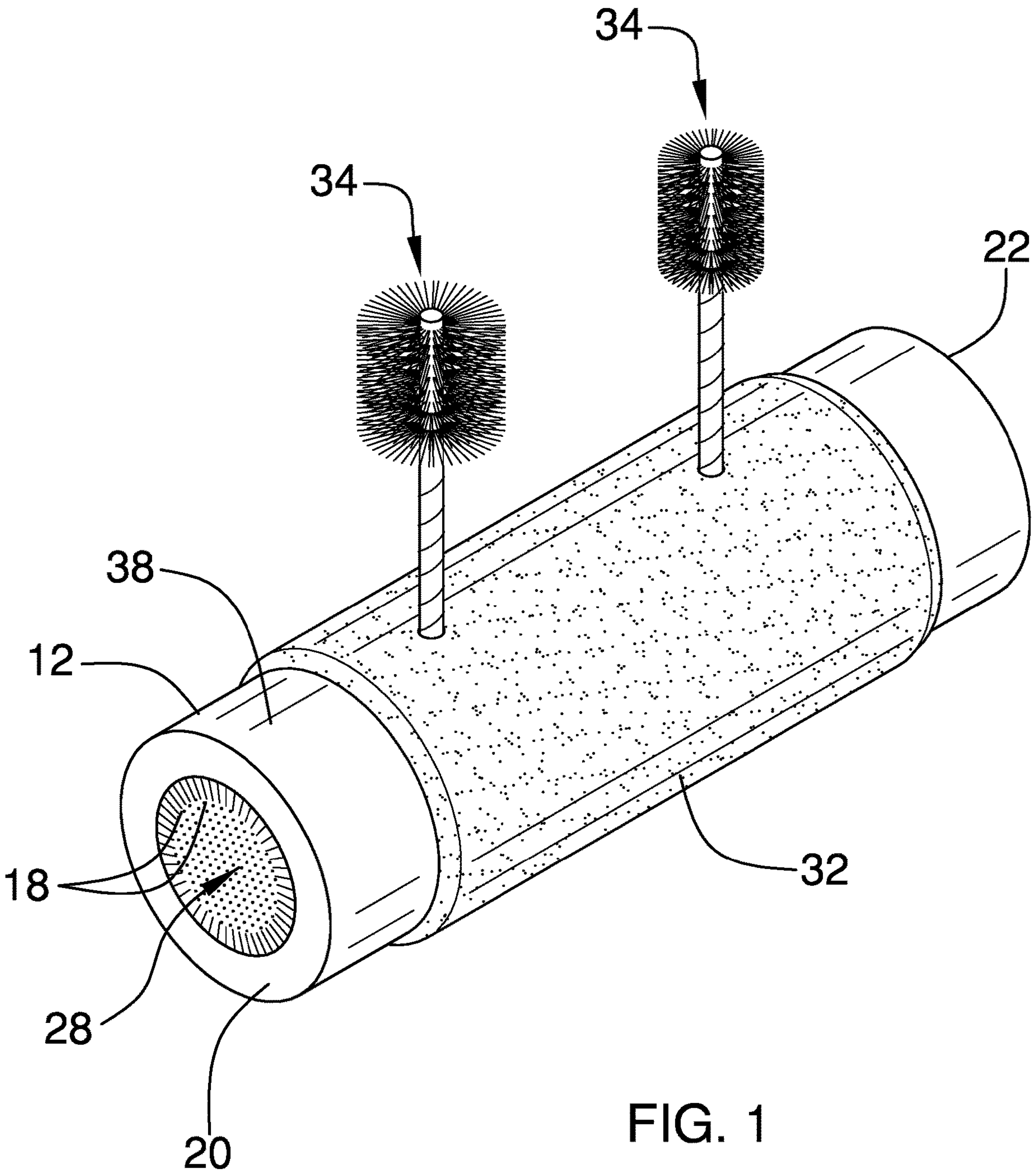
FIG. 1 is a front perspective view of an embodiment of the disclosure.
Figure 2:
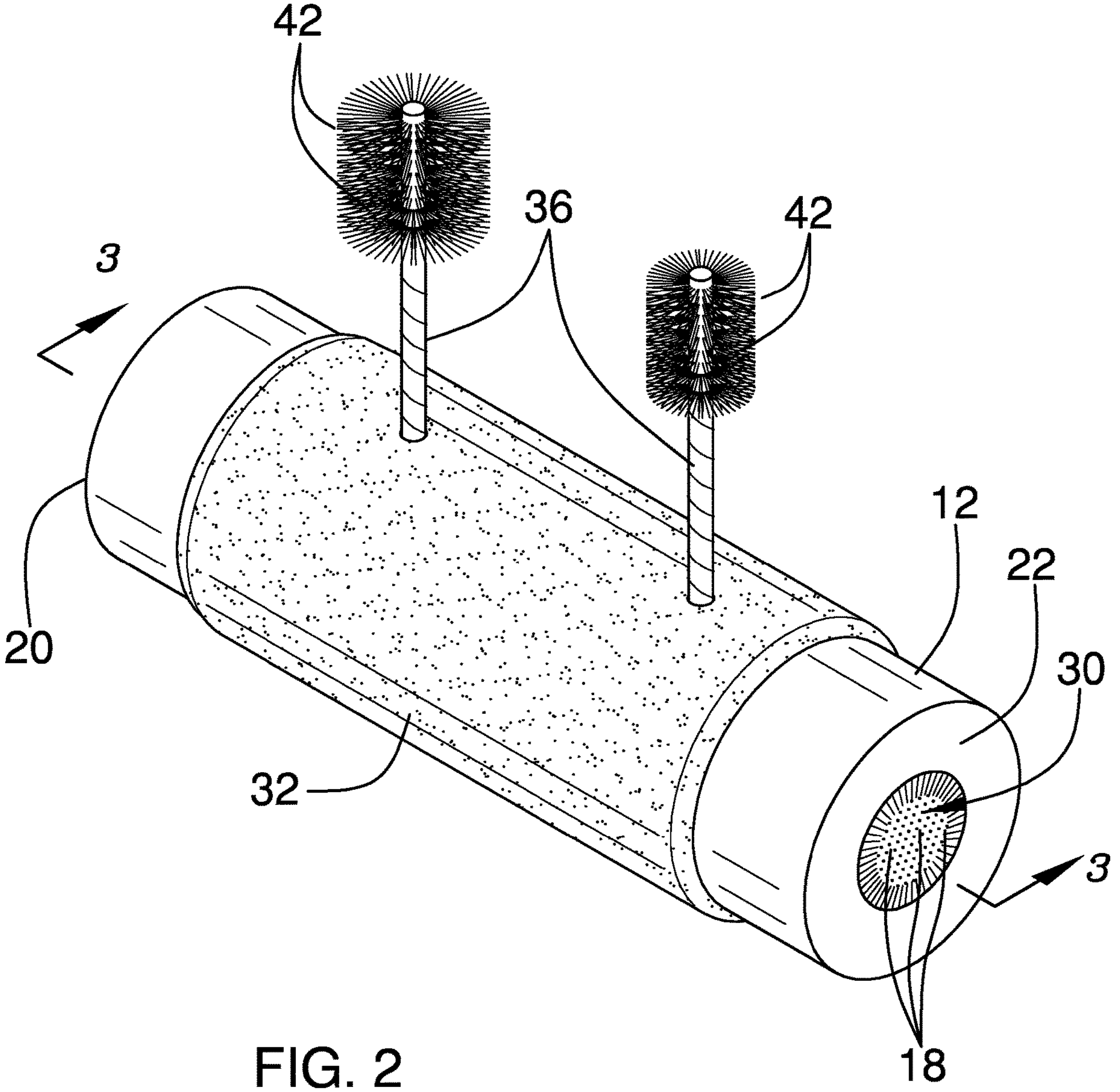
FIG. 2 is a back perspective view of an embodiment of the disclosure.
Figure 3:
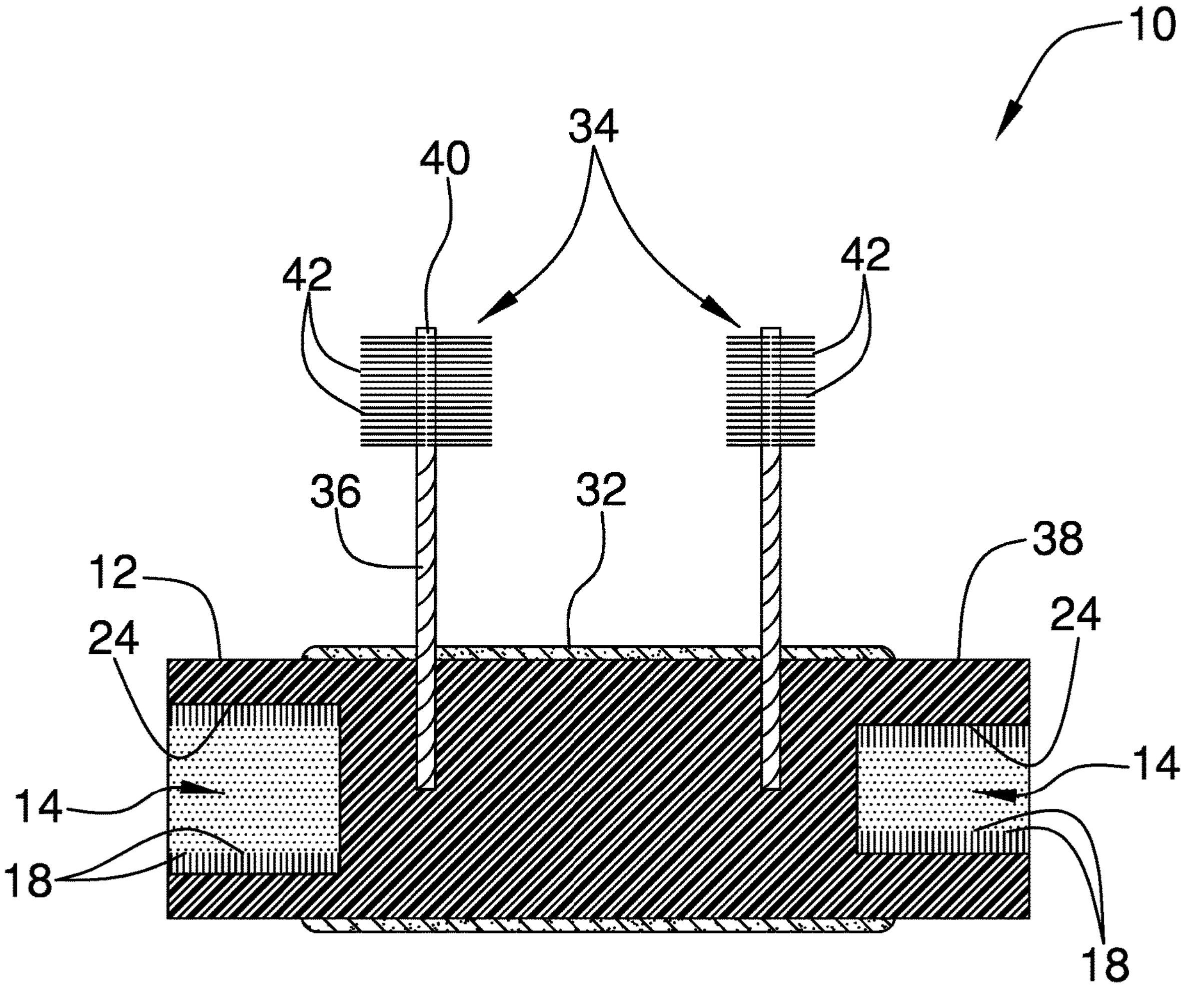
FIG. 3 is a cross sectional view taken along line 3-3 of FIG. 2 of a burr removal tool according to an embodiment of the disclosure.
Figure 4:
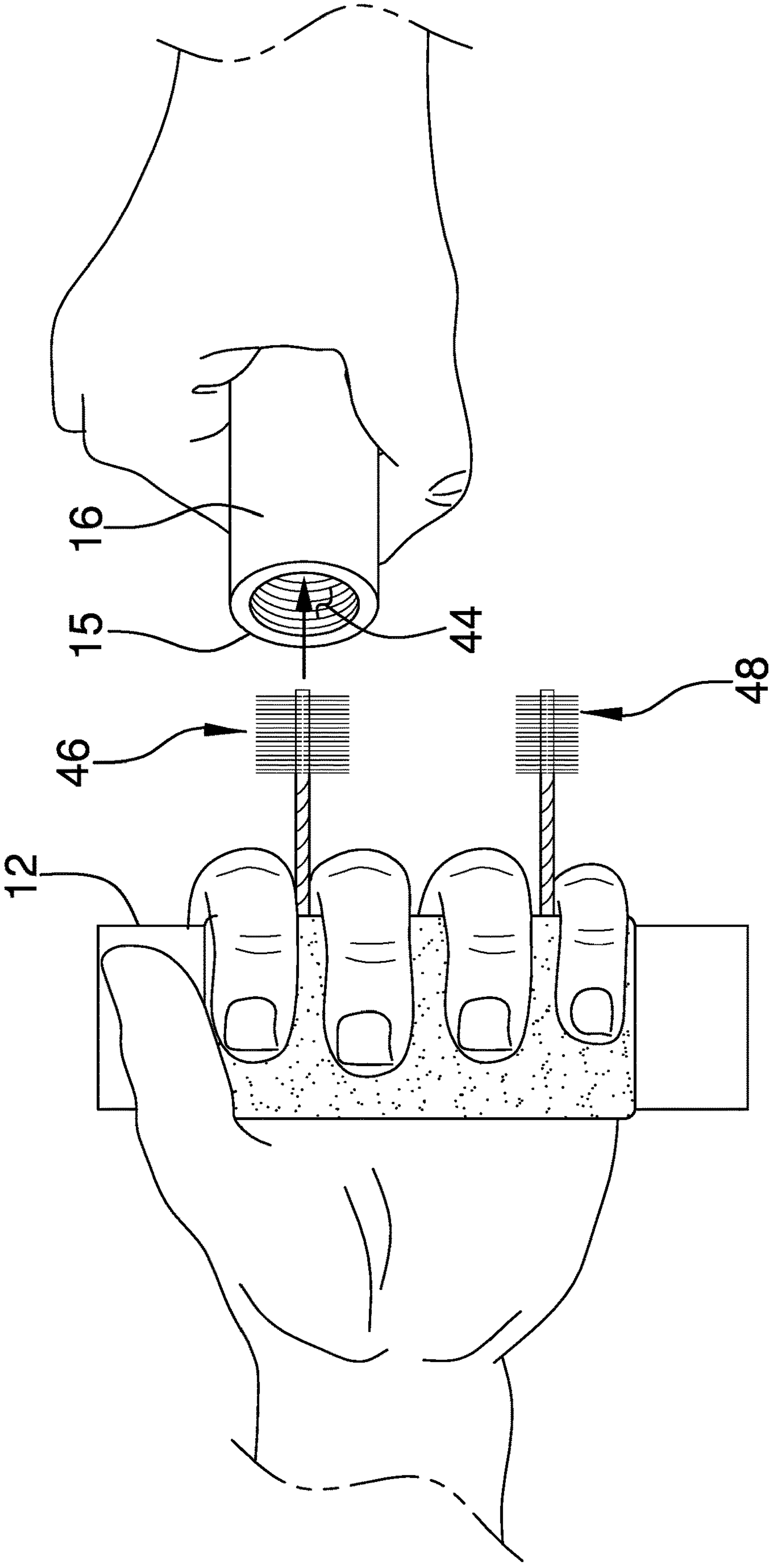
FIG. 4 is a perspective in-use view of an embodiment of the disclosure showing a brush being inserted into a pipe.
Figure 5:
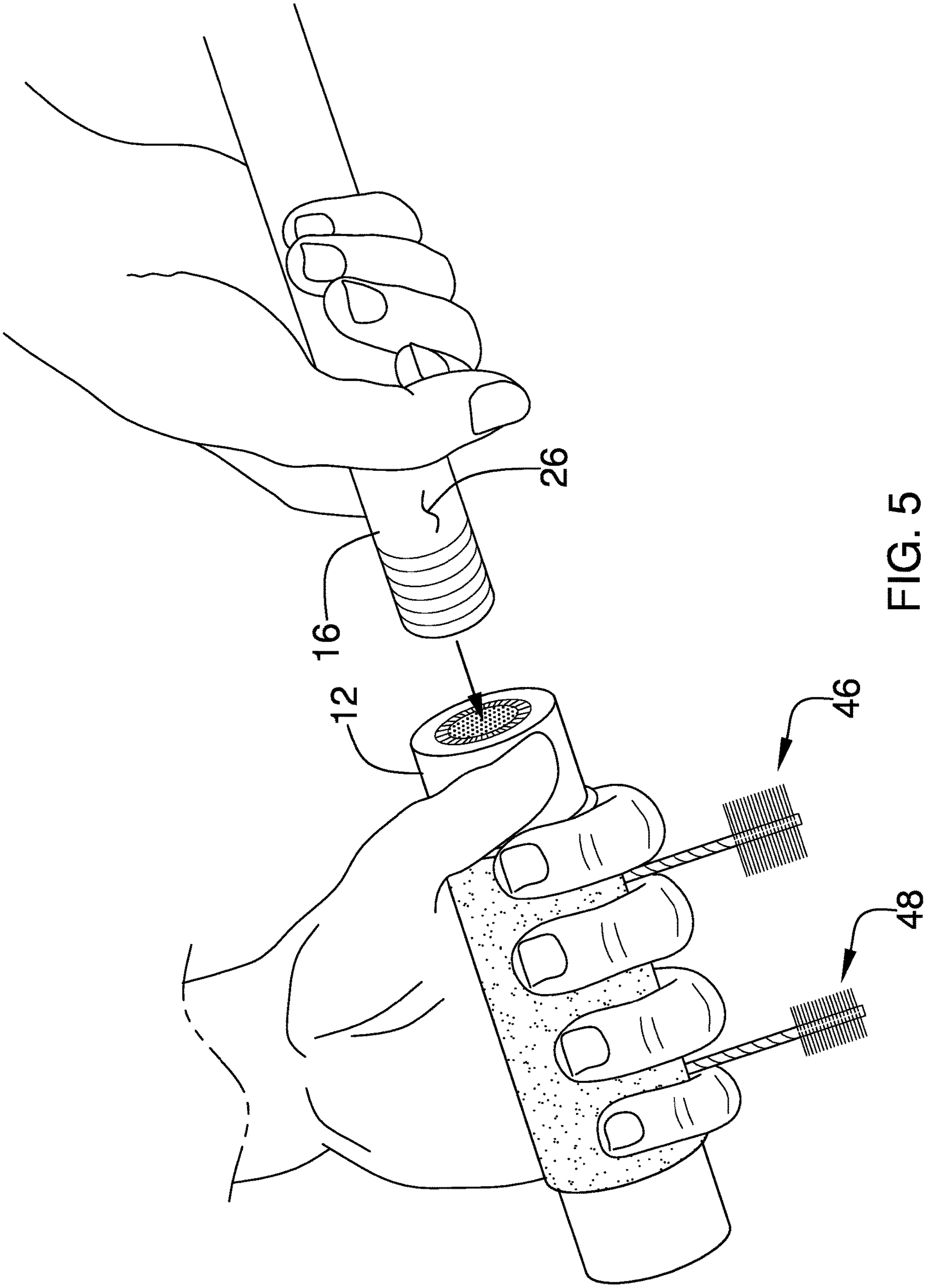
FIG. 5 is a perspective in-use view of an embodiment of the disclosure showing a pipe being inserted into a well.

With reference now to the drawings, and in particular to FIGS. 1 through 5 thereof, a new burr tool embodying the principles and concepts of an embodiment of the disclosure and generally designated by the reference numeral 10 will be described.

As best illustrated in FIGS. 1 through 5, the burr removal tool 10 generally comprises a cylinder 12 that has a pair of wells 14 each recessed into opposing ends of the cylinder 12 for insertably receiving an end 15 of a pipe 16. The pipe 16 may be a copper pipe or other type of metallic pipe. The cylinder 12 has a plurality of first bristles 18 that is each disposed within a respective one of the wells 14. The plurality of first bristles 18 in a respective one of the wells 14 scrubbing the pipe 16 when the pipe 16 is inserted into the respective well 14 for abrading burrs from the pipe 16. Each of the wells 14 is recessed into a respective one of a first end 20 or a second end 22 of the cylinder 12.

The well 14 in the first end 20 has a diameter that is greater than a diameter of the well 14 in the second end 22 thereby facilitating the well 14 in each of the first end 20 and the second end 22 to accommodate pipes of varying diameters. Each of the wells 14 has a bounding surface 24 and each of the first bristles 18 extends away from the bounding surface 24 of the respective well 14 thereby facilitating the first bristles 18 to abrade an outer surface 26 of the pipe 16 when the pipe 16 is inserted into the respective well 14. The first bristles 18 are distributed around a full circumference of the respective well 14 and along a full depth of the respective well 14. A first one of the wells 28 may have a diameter of approximately 19.0 mm and a second one of the wells 30 may have a diameter of approximately 12.5 mm. Furthermore, the cylinder 12 may have a length ranging between approximately 12.0 cm and 18.0 cm and a diameter ranging between approximately 4.0 cm and 5.0 cm.

A cushion 32 is wrapped around the cylinder 12 thereby facilitating the cushion 32 to be gripped for manipulating the cylinder 12. The cushion 32 is comprised of a resiliently compressible material thereby facilitating the cushion 32 to enhance comfort for gripping the cushion 32. Furthermore, the cushion 32 extends substantially between the first end 20 and the second end 22 of the cylinder 12. The cushion 32 may have a thickness of approximately 6.5 mm and a length of approximately 7.5 cm.

A pair of brushes 34 is provided and each of the brushes 34 is coupled to and extends away from the cylinder 12 thereby facilitating a respective one of the brushes 34 to be inserted into the pipe 16 for scrubbing inside of the pipe 16. Furthermore, each of the brushes 34 is perpendicularly oriented with the pair of wells 14 in the cylinder 12. Each of the brushes 34 comprises a stem 36 that is coupled to and extends away from an outer wall 38 of the cylinder 12. As is most clearly shown in FIG. 3, the stem 36 extends substantially into the cylinder 12 to securely attach the stem 36 to the cylinder 12. The stem 36 extends through the cushion 32, the stem 36 associated with each of the brushes 34 is spaced apart from a center of the outer wall 38 of the cylinder 12 and the stem 36 has a distal end 40 with respect to the outer wall 38.

Each of the brushes 34 includes a plurality of second bristles 42 that is coupled to and extends outwardly from the stem 36. In this way the second bristles 42 can abrade an inside surface 44 of the pipe 16 when the respective brush 34 is inserted into the pipe 16. The plurality of second bristles 42 is distributed around a full circumference of the stem 36 and the plurality of second bristles 42 is distributed from the distal end 40 of the stem 36 toward the cylinder 12. Additionally, each of the second bristles 42 associated with a first one of the brushes 46 has a length that is greater than a length of each of the second bristles 42 associated with a second one of the brushes 48. In this way each of the first brush 46 and the second brush 48 can accommodate pipes of varying diameters. Each of the second bristles 42 on the first brush 46 may have a length sufficient such that the total diameter defined by the plurality of second bristles 18 on the first brush 46 is approximately 19.0 mm. Additionally, each of the second bristles 42 on the second brush 48 may have a length sufficient such that total diameter defined by the plurality of second bristles 42 on the second brush 48 is approximately 12.5 mm.

In use, the cushion 32 is gripped and a pipe 16 is inserted into either the first well 28 or the second well 30, depending on the outer diameter of the pipe 16, to facilitate the first bristles 18 in the first well 28 or second well 30 to abrade the outer wall 38 of the pipe 16. In this way burrs and other deformities can be removed from the outer wall 38 of the pipe 16 to prepare the pipe 16 to be soldered. Either the first brush 46 or the second brush 48, depending on the inside diameter of the pipe 16, is inserted into the pipe 16 to facilitate the second bristles 42 on the first brush 46 or the second brush 48 that abrade the inside surface 44 of the pipe 16. In this way burrs and other deformities can be removed from the inside surface 44 of the pipe 16 to prepare the pipe 16 to be soldered. Furthermore, pipes of varying sizes can be prepared for soldering without requiring a user to manipulate two different tools thereby enhancing speed and efficiency with which the pipes of varying sizes can be prepared.

With respect to the above description then, it is to be realized that the optimum dimensional relationships for the parts of an embodiment enabled by the disclosure, to include variations in size, materials, shape, form, function and manner of operation, tool and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A burr removal tool for removing burrs from an outer surface or an inner surface of a pipe, said tool comprising:

a cylinder having a pair of wells each being recessed into opposing ends of said cylinder for insertably receiving an end of a pipe, said cylinder having a plurality of first bristles each being disposed within a respective one of said wells, said plurality of first bristles in a respective one of said wells scrubbing the pipe when the pipe is inserted into said respective well for abrading burrs from the pipe; and a pair of brushes, each of said brushes being coupled to and extending away from said cylinder thereby facilitating a respective one of said brushes to be inserted into the pipe for scrubbing inside of the pipe, each of said brushes being perpendicularly oriented with said pair of wells in said cylinder.

2. The tool according to claim 1, wherein:

each of said wells is recessed into a respective one of a first end or a second end of said cylinder, said well in said first end having a diameter being greater than a diameter of said well in said second end thereby facilitating said well in each of said first end and said second end to accommodate pipes of varying diameters, each of said wells having a bounding surface; and each of said first bristles extends away from said bounding surface of said respective well thereby facilitating said first bristles to abrade an outer surface of the pipe when the pipe is inserted into said respective well, said first bristles being distributed around a full circumference of said respective well and along a full depth of said respective well.

3. The tool according to claim 2, further comprising a cushion being wrapped around said cylinder thereby facilitating said cushion to be gripped for manipulating said cylinder, said cushion being comprised of a resiliently compressible material thereby facilitating said cushion to enhance comfort for gripping said cushion, said cushion extending substantially between said first end and said second end of said cylinder.

4. The tool according to claim 1, wherein:

said tool includes a cushion wrapped around said cylinder; and each of said brushes comprises a stem being coupled to and extending away from an outer wall of said cylinder, said stem extending through said cushion, said stem associated with each of said brushes being spaced apart from a center of said outer wall of said cylinder, said stem having a distal end with respect to said outer wall.

5. The tool according to claim 4, wherein each of said brushes includes a plurality of second bristles, each of said second bristles being coupled to and extending outwardly from said stem thereby facilitating said second bristles to abrade an inside surface of the pipe when said respective brush is inserted into the pipe, said plurality of second bristles being distributed around a full circumference of said stem, said plurality of second bristles being distributed from said distal end of said stem toward said cylinder.

6. The tool according to claim 5, wherein each of said second bristles associated with a first one of said brushes has a length being greater than a length of each of said second bristles being associated with a second one of said brushes thereby facilitating each of said first brush and said second brush to accommodate pipes of varying diameters.

7. A burr removal tool for removing burrs from an outer surface or an inner surface of a pipe, said tool comprising:

a cylinder having a pair of wells each being recessed into opposing ends of said cylinder for insertably receiving an end of a pipe, said cylinder having a plurality of first bristles each being disposed within a respective one of said wells, said plurality of first bristles in a respective one of said wells scrubbing the pipe when the pipe is inserted into said respective well for abrading burrs from the pipe, each of said wells being recessed into a respective one of a first end or a second end of said cylinder, said well in said first end having a diameter being greater than a diameter of said well in said second end thereby facilitating said well in each of said first end and said second end to accommodate pipes of varying diameters, each of said wells having a bounding surface, each of said first bristles extending away from said bounding surface of said respective well thereby facilitating said first bristles to abrade an outer surface of the pipe when the pipe is inserted into said respective well, said first bristles being distributed around a full circumference of said respective well and along a full depth of said respective well;

a cushion being wrapped around said cylinder thereby facilitating said cushion to be gripped for manipulating said cylinder, said cushion being comprised of a resiliently compressible material thereby facilitating said cushion to enhance comfort for gripping said cushion, said cushion extending substantially between said first end and said second end of said cylinder; and a pair of brushes, each of said brushes being coupled to and extending away from said cylinder thereby facilitating a respective one of said brushes to be inserted into the pipe for scrubbing inside of the pipe, each of said brushes being perpendicularly oriented with said pair of wells in said cylinder, each of said brushes comprising:

a stem being coupled to and extending away from an outer wall of said cylinder, said stem extending through said cushion, said stem associated with each of said brushes being spaced apart from a center of said outer wall of said cylinder, said stem having a distal end with respect to said outer wall; and a plurality of second bristles, each of said second bristles being coupled to an extending outwardly from said stem thereby facilitating said second bristles to abrade an inside surface of the pipe when said respective brush is inserted into the pipe, said plurality of second bristles being distributed around a full circumference of said stem, said plurality of second bristles being distributed from said distal end of said stem toward said cylinder, each of said second bristles associated with a first one of said brushes having a length being greater than a length of each of said second bristles being associated with a second one of said brushes thereby facilitating each of said first brush and said second brush to accommodate pipes of varying diameters.

* * * * *